US010184371B2

(12) United States Patent
Nguyen et al.

(10) Patent No.: US 10,184,371 B2
(45) Date of Patent: Jan. 22, 2019

(54) ACTIVE NOISE CANCELATION SYSTEMS AND DEVICES

(71) Applicant: General Electric Company, Schenectady, NY (US)

(72) Inventors: Quoc Hoai Nguyen, Houston, TX (US); Arkadiusz Bartlomiej Nagorski, Warsaw (PL); Eric YuHang Fung, Houston, TX (US); Eric Tracy Watson, Houston, TX (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 15/037,270

(22) PCT Filed: Apr. 20, 2016

(86) PCT No.: PCT/PL2016/000044
§ 371 (c)(1),
(2) Date: May 17, 2016

(87) PCT Pub. No.: WO2017/183999
PCT Pub. Date: Oct. 26, 2017

(65) Prior Publication Data
US 2018/0094555 A1    Apr. 5, 2018

(51) Int. Cl.
*F01N 1/06*    (2006.01)
*G10K 11/178*    (2006.01)
(Continued)

(52) U.S. Cl.
CPC ............ *F01N 1/065* (2013.01); *F02C 7/045* (2013.01); *G10K 11/178* (2013.01); *H04R 1/083* (2013.01);
(Continued)

(58) Field of Classification Search
USPC .......... 381/71, 71.1, 71.3, 71.5, 71.7, 71.11, 381/71.4, 71.8, 86, 94.1
See application file for complete search history.

(56) References Cited

U.S. PATENT DOCUMENTS 3,936,606 A    2/1976 Wanke
4,665,549 A    5/1987 Eriksson et al.
(Continued)

FOREIGN PATENT DOCUMENTS

CN    101503975 A    8/2009
CN    203242332 U    10/2013
(Continued)

OTHER PUBLICATIONS

PCT Search Report and Written Opinion issued in connection with corresponding Application No. PCT/PL2014/000150 dated Apr. 7, 2015.
(Continued)

*Primary Examiner* — Yosef K Laekemariam
(74) *Attorney, Agent, or Firm* — Fletcher Yoder, P.C.

(57) ABSTRACT

A device includes a housing and a core configured to be secured within the housing. The core includes a microphone configured to detect a sound signal. The core also includes a control board configured to generate a noise-canceling sound signal based on the sound signal and a set of transfer functions. The core further includes a speaker configured to deliver the noise-canceling sound signal. The device also includes a fastener configured to connect the housing to an air filter of an intake vent of an enclosure of a power generation unit.

21 Claims, 5 Drawing Sheets

(51) Int. Cl.
*F02C 7/045* (2006.01)
*H04R 1/08* (2006.01)

(52) U.S. Cl.
CPC ............. *G10K 2210/1082* (2013.01); *G10K 2210/3055* (2013.01)

(56) References Cited

U.S. PATENT DOCUMENTS

| | | | |
|---|---|---|---|
| 4,815,139 A | 5/1989 | Eriksson et al. | |
| 4,876,722 A | 10/1989 | Dekker et al. | |
| 5,272,286 A | 12/1993 | Cain et al. | |
| 5,355,417 A | 10/1994 | Burdisso et al. | |
| 5,386,689 A | 2/1995 | Bozich et al. | |
| 5,478,199 A | 12/1995 | Gliebe | |
| 5,602,926 A * | 2/1997 | Ohashi | G10K 11/1784 381/71.11 |
| 5,689,572 A * | 11/1997 | Ohki | G10K 11/178 381/71.3 |
| 5,828,759 A | 10/1998 | Everingham | |
| 5,966,452 A * | 10/1999 | Norris | B06B 1/20 381/71.1 |
| 6,084,971 A * | 7/2000 | McLean | F02M 35/125 381/71.5 |
| 6,160,892 A | 12/2000 | Ver | |
| 6,996,242 B2 | 2/2006 | McLean et al. | |
| 2001/0049999 A1 | 12/2001 | Vanderveen et al. | |
| 2002/0072816 A1 * | 6/2002 | Shdema | H04L 12/2805 700/94 |
| 2003/0059058 A1 | 3/2003 | Chiara | |
| 2012/0312629 A1 | 12/2012 | Hawwa | |
| 2015/0100221 A1 * | 4/2015 | Routledge | F01N 1/165 701/111 |

FOREIGN PATENT DOCUMENTS

| | | |
|---|---|---|
| DE | 19716696 C1 | 7/1998 |
| EP | 1162600 | 12/2001 |
| WO | 0005489 A1 | 2/2000 |
| WO | PCT/PL2014/000150 | 12/2014 |

OTHER PUBLICATIONS

U.S. Appl. No. 14/424,583, filed Feb. 27, 2015, Quoc Nguyen.
International Search Report issued in connection with corresponding PCT Application No. PCT/PL2016/000044 dated Dec. 23, 2016.
International Search Report and Written Opinion issued in connection with corresponding PCT Application No. PCT/PL2016/000044 dated Mar. 8, 2017.

* cited by examiner

ACTIVE NOISE CANCELATION SYSTEMS AND DEVICES

This application is a national stage of PCT Application No. PCT/PL2016/000044, entitled "Active Noise Cancellation Systems and Devices", filed on Apr. 20, 2016. The foregoing application is incorporated by reference in its entirety.

BACKGROUND

The subject matter disclosed herein relates to active noise control for use with industrial machinery systems.

Power stations, such as those employing turbine engines or other combustion engines, can generate excess noise within the housing of the equipment. For example, intake and exhaust ducts convey air/gases (as well as noise) from within an inner working zone to the exterior of the housing. Unfortunately, the power station may be placed in an area where sound levels are restricted or unwanted. In this situation, noise control is desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a device includes a housing and a core configured to be secured within the housing. The core includes a microphone configured to detect a sound signal. The core also includes a control board configured to generate a noise-canceling sound signal based on the sound signal and a set of transfer functions. The core further includes a speaker configured to deliver the noise-canceling sound signal. The device also includes a fastener configured to connect the housing to an air filter of an intake vent of an enclosure of a power generation unit.

In a second embodiment, a system includes an air intake for use within a power generation unit. The air intake includes a plurality of active noise-canceling devices. Each active noise-canceling device of the plurality of active noise-canceling devices includes a housing and a core configured to be secured within the housing. The core includes a microphone configured to detect a sound signal. Each active noise-canceling device also includes a fastener configured to connect the housing to an air filter of an intake vent of an enclosure of a power generation unit. Each active noise-canceling device further includes a speaker configured to deliver a noise-canceling sound signal. The air intake also includes a control board configured to generate noise-canceling sound signals based on the sound signals detected by the microphones of the plurality of active noise-canceling devices and a set of transfer functions.

In a third embodiment, a device includes a housing configured to connect to a weather hood of an intake vent of an enclosure of a power generation unit. The device also includes a core configured to be secured within the housing. The core includes a control board configured to generate a noise-canceling sound signal based on a sound signal generated by the power generation unit and a set of transfer functions. The device further includes a speaker configured to deliver the noise-canceling sound signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include active noise-canceling devices that may be used in a system performing an industrial process that generates noise. The active noise-canceling devices dampen or reduce noise, for example, exiting an external opening of a duct of the system. Rather than using only passive noise abatement systems such as absorptive, fiber-filled baffles, or ductwork, the active noise-canceling devices employ speakers or other acoustic devices that produce sound out of phase with the sound generated by the engine and equipment. This may operate to cancel or reduce the level of noise and thus result in a system that is collectively quieter. The active noise-canceling devices may operate individually or collectively to reduce noise efficiently.

In some embodiments, each module unit is pre-programmed to respond to the noise according to location-specific characteristics of the system that are pre-defined on a control board of each active noise-canceling device. The system may include several active noise-canceling devices. The combination of active noise-canceling devices produces efficient noise cancellation or reduction across a wide frequency range.

Figure 1:
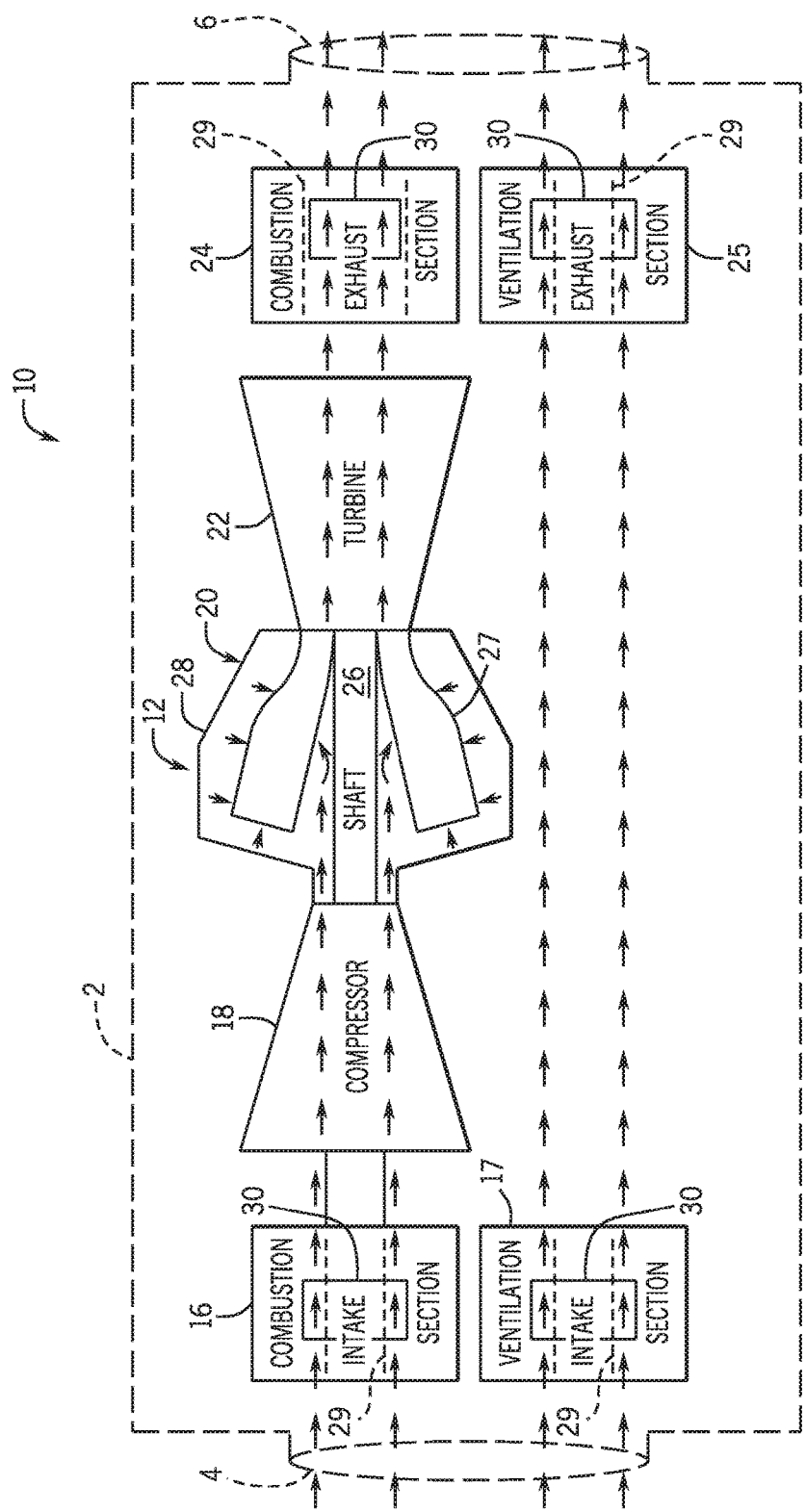
FIG. 1 is a schematic diagram of a system that includes a gas turbine engine and employs active noise-canceling devices, in accordance with an embodiment of the present disclosure.

FIG. 1 is a block diagram of a system 10 that includes a gas turbine engine 12 and employs active noise-canceling devices, in accordance with an embodiment of the present disclosure. In certain embodiments, the system 10 may be a part of an aircraft, a watercraft, a locomotive, etc. The active noise-canceling devices may also be employed in other power generation units such as steam turbine units, combustion power generation units, industrial process units, compressors, power drive units, or the like. The gas turbine engine 12 is included within a building wall or enclosure 2. The enclosure 2 shields and protects the gas turbine engine 12 from external material and forces, and conducts air around the turbine casing and other supporting components inside the enclosure. The enclosure 2 includes an intake vent 4 and an exhaust vent 6. Each of the intake vent 4 and the exhaust vent 6 may include multiple vents and/or locations where air and other gases are conveyed into and out of the enclosure 2. Additionally, the intake vent 4 and the exhaust vent 6 may include filters, baffles, and/or treatment systems for cleaning the air used in or around the gas turbine engine 12.

The illustrated gas turbine engine 12 includes a combustion air intake section 16 and a ventilation intake section 17 as part of the intake vent 4 of the enclosure 2. The combustion intake section 16 directs air to the gas turbine engine 12 while the ventilation intake section 17 directs air around the gas turbine engine 12, for example, to cool components of the gas turbine engine 12. The gas turbine engine 12 also includes a compressor 18, a combustor section 20, a turbine 22, and an exhaust section 24. The turbine 22 is coupled to the compressor 18 via a shaft 26. As indicated by the arrows, air may enter the gas turbine engine 12 through the intake section 16 and flow into the compressor 18, which compresses the air prior to entry into the combustor section 20. The compressed air from the compressor 18 enters combustors 27, where the compressed air may mix and combust with fuel within the combustors 27 to drive the turbine 22. The illustrated combustor section 20 includes a combustor housing 28 disposed concentrically or annularly about the shaft 26 between the compressor 18 and the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through a series of ducts 29 within the exhaust section 24. Furthermore, as described below, each of the combustion intake section 16, the ventilation intake section 17, the combustion exhaust section 24, and a ventilation exhaust section 25 may include a duct 29. The combustion gases may pass through several additional systems such as steam turbines, heat transfer systems, and exhaust treatment systems, among others. Additionally, while illustrated as being downstream from the gas turbine engine 12, the exhaust section 24, in other embodiments, may be placed after any other noise source or combustion system. The gas turbine engine 12 is an example of the system 10 in which hot combustion gases may provide design constraints due to relatively high temperatures employed within the system 10. Furthermore, the exhaust section 24 and the ducts 29 may be described as being downstream from the noise source (e.g., gas turbine engine 12), meaning between the noise source and an exit of the system 10. That is, "downstream," when referred to below, is described with respect to the noise source, even if air flow (for example, in the combustion intake section 16 or the ventilation intake section 17) is flowing opposite to the direction of sound travel.

As may be appreciated, the combustion of the mixture of air and fuel may produce an excess of noise. In addition, the noise generated by the compressor section 18 passes through the intake vent 4 and the exhaust vent 6. To combat the noise produced by the system 10, the intake vent 4 and the exhaust vent 6 may include one or more active noise-canceling devices 30. The active noise-canceling device 30 may be tuned to the specific of location of where the active noise-canceling device 30 is located. That is, the location of where the active noise-canceling device 30 is located may include materials and configurations that improve performance of noise control/cancellation in that particular area. The active noise-canceling device 30 may produce sound that is opposite in phase with the sound produced by the system 10 that is traveling through the location and therefore cancels out and attenuates the sound emanating from the exit of the location. The particular signatures of the sound exiting the section may depend on a number of location-specific characteristics including the geometry of the ducts 29, the location of the active noise-canceling device 30, physical properties (e.g., temperature, pressure) of the gases passing through the location, among other things. These location-specific characteristics may be collected into a transfer function, which may be hard-wired into one or more active noise-canceling devices 30.

Figure 2:
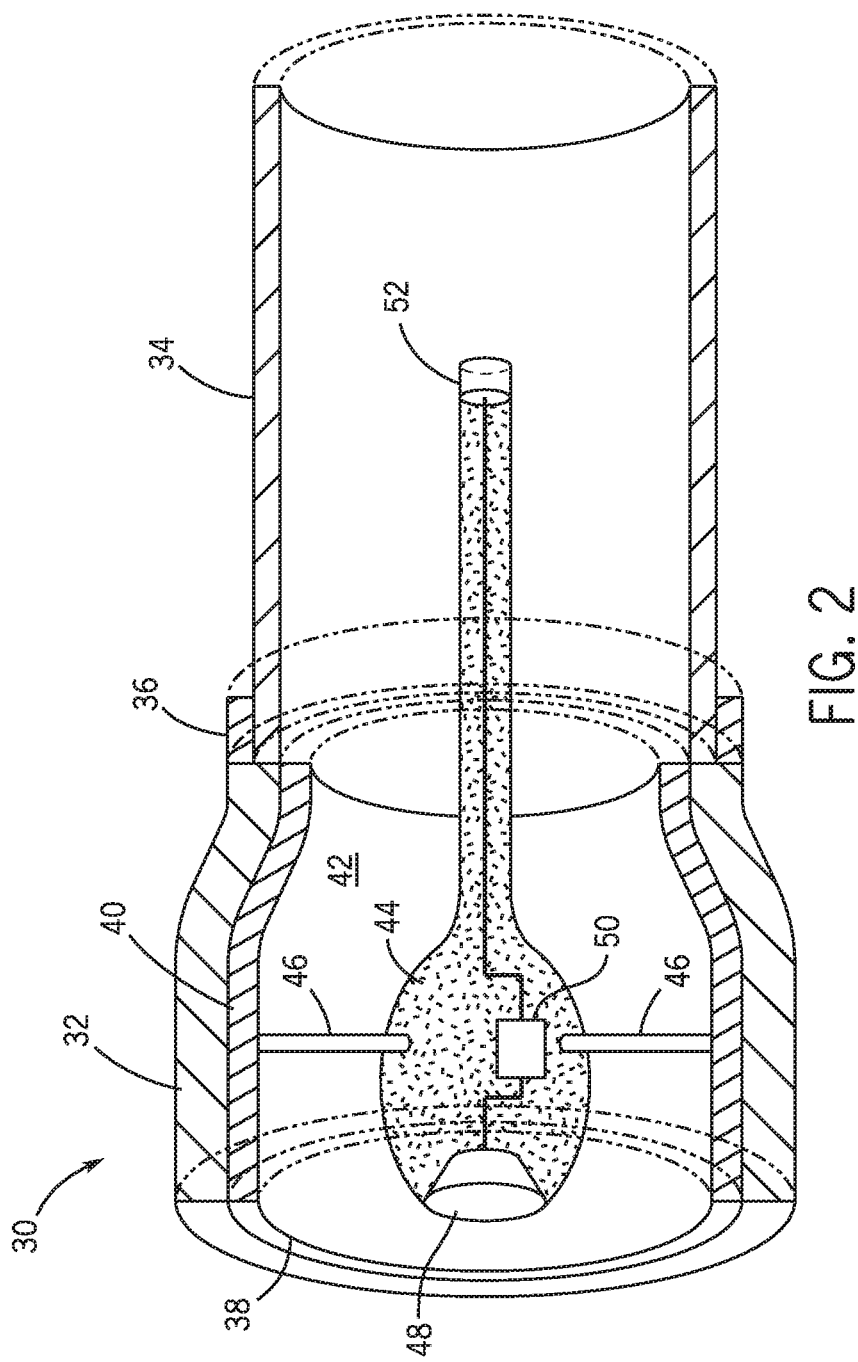
FIG. 2 is a cross-sectional side view of an active noise-canceling device, in accordance with an embodiment of the present disclosure.

FIG. 2 is a cross-sectional side view of the active noise-canceling device 30 that may be used within the intake vent 4, in accordance with an embodiment of the present disclosure. The active noise-canceling device 30 includes a housing 32 and, as illustrated, may be connected to an air filter 34 (e.g. filter media, filter cartridge, filter canister, or any type of air filter device) via a fastener 36. The fastener 36 may be any implement or coupling that enables the housing 32 to connect to the air filter 34. In some embodiments, the fastener 36 may be designed for ease of and quick replacement, such that the air filter 34 may releasably detach from the housing 32. That is, the air filter 34 may fully detach from the housing 32 as a separate component. For example, the fastener 36 may include threading, clips, slots and tabs/bolts, pins, locking mechanisms, etc., or any combination thereof. In this manner, the active noise-canceling devices 30 may be modular, easily removed, and reconnected to a replacement air filter 34. For example, when replacing the air filter 34 due to regular use, the active noise-canceling device 30 may be easily removed, the air filter 34 cleaned or replaced with a new air filter 34, and the active noise-canceling device 30 easily reconnected to the cleaned or new air filter 34. In some embodiments, the fastener 36 may include seal, such as one or more fluid seals or O-rings, to ensure a contained environment for filtering air and measuring and canceling noise. The fastener 36 or a second fastener may be used to mount or connect the active noise-canceling device 30 (with or without the air filter 34) within a predetermined portion of the enclosure 2, such as the duct 29 of the intake vent 4. For example, the fastener 36 or the second fastener may be configured to mount the active noise-canceling device 30 to a flow path hole, a component of a pre-filter room, or a weather hood of the intake vent 4. In some embodiments, the active noise-canceling device 30 may be fixed to the air filter 34 such that they are one integrated component. As such, replacing the air filter 34 may result in also replacing the active noise-canceling device 30. Typically, the mid-stream active noise-canceling device 30 of FIG. 2 may be mounted within the intake vent 4, where the air in the flow path is relatively cool. Cooler air/gases enables the combustion intake section 16 or the ventilation intake section 17 to include a flow path in which the air/gases flow through or around the air filter 34 and the housing 32. In some embodiments, the active noise-canceling device 30 may be mounted in other locations of the system 10 (e.g., the combustion exhaust section 24, the ventilation exhaust section 25, etc.).

In addition to the air filter 34 and the housing 32, the active noise-canceling device 30 includes a core 44, which may be foam-covered, that secures additional components that aid in noise control/cancellation. The core 44 includes electronic components configured to capture sound and deliver a noise-canceling sound from the active noise-canceling device 30. The core 44 may also include a foam structure that is mounted internal to the inner area 42 by waveguides 46 and may include a triangular, a substantially square, a rectangular, a hexagonal, or an octagonal geometry that provides optimum flow conditions. That is, the shape of the core 44 may be shaped to influence the air/gases to flow with minimum acoustic turbulence. As illustrated, the waveguides 46 may secure the core 44 to an inner portion 40 of the housing 32 via thin attachments that minimize impact of the air flow through the active noise-canceling device 30. In other embodiments, the waveguides 46 may be longer and fin-like such that the flow path through the housing 32 is divided into multiple discrete regions. For example, the housing 32 may be divided into two, three, four, five, six, seven, eight or more discrete regions. Each discrete region may be sized to control or reduce a specific tonal noise or range of noise frequencies. For example, smaller discrete regions corresponding with a higher number of waveguides 46 may reduce tonal noise in a higher frequency range.

The core 44 includes one or more speakers 48 mounted in one or more locations to control or reduce sound. As illustrated, the speaker 48 may be located near a front end 38 of the active noise-canceling device 30. The front end 38, in some embodiments, may be the location from which air enters the active noise-canceling device 30, and sound exits. That is, in certain embodiments, the sound may be traveling in an opposite direction from the air flow. For example, in FIG. 2, the flow of air may be from the left of the figure to the right while the sound, meanwhile, may travel from right to left. In specific examples, the flow of air may pass over the active noise-canceling device 30 radially through the air filter 34, which may be constructed of, for example, mesh material or any other material that allows for air passage there through. As mentioned above, the core 44 may include waveguides 46 that divide the housing 32 into discrete regions. For example, there may be two, three, four, five, six, seven, eight, or more discrete regions that divide the housing 32. Each discrete region may include a separate speaker 48 instead of, or in addition to, the front speaker 48 illustrated in FIG. 2. The separate speakers 48 may produce the same sound or may be individually given a signal that focuses on a specific sub-part of the noise within the intake vent 4. For example, a speaker 48 positioned in one discrete region of the active noise-canceling device 30 may control or reduce sound of one frequency range while a different speaker 48 positioned in a different discrete section of the active noise-canceling device 30 controls or reduces sound of a different frequency range.

The sound that is produced by the speaker 48 of the core 44 is determined by a control board 50 that is also part of the core 44. The sound may be produced to control or reduce sound generated by the engine 12 between approximately 50 Hertz (Hz) and approximately 4000 Hz. However, in other embodiments, the sound produced may control or reduce sound generated by the engine 12 at frequencies up to approximately 5000 Hz, approximately 6000 Hz, approximately 7000 Hz, approximately 8000 Hz, or more. As described in detail below, the control board 50 may send a noise-canceling signal to multiple speakers 48 that control or reduce sound from multiple ranges. The control board 50 may include, for example, a Single Input Single Output (SISO), Single Input Multiple Output (SIMO), Multiple Input Single Output (MISO), or Multiple Input Multiple Output (MIMO) setup, as desired based on the sound to be canceled.

Different modules, controlling different parts, locations, and/or systems of the filter house may use different transfer functions, which may focus on different frequency ranges. For example, ventilation portion sound transfer function and duct system design may be optimized one way for low-mid frequency, whereas the combustion portion may be optimized for combustion engine noise at low and mid frequency ranges, and at specific high frequency ranges, such as air inlet compressor blade-pass frequencies and harmonics. The control board 50 is programmed with a transfer function which may be stored digitally on permanent or temporary memory (i.e. ROM or RAM memory) that is pre-determined according to location-specific characteristics of the active noise-canceling device 30 and the installed location (e.g., intake vent 4, combustion intake section 16, ventilation intake section 17, etc.). For example, location-specific characteristics may include the geometric arrangement of the duct 29, the position of the active noise-canceling device 30, or the potential for reverberation of the surrounding materials (e.g., duct 29, engine 12, etc.).

To determine the sound signal to deliver to the speaker 48, the control board 50 receives the sound signal from a microphone 52 of the active noise-canceling device 30. As illustrated in FIG. 2, the microphone 52 may be placed on the core 44, but the microphone 52 may also be placed, for example, on the air filter 34 (or in another location of the active noise-canceling device 30), as long as there is a good synchronization and communication between the speaker 48 and the microphone 52. The speaker 48, control board 50, and the microphone 52 may collectively be designated as the core 44, whether the components (i.e., speaker 48, control board 50, and microphone 52) are all located on the same structural component. However, in another embodiment, one or more of the speakers 48, control board 50, and microphone 52 may be in a physically distinct location (e.g. not part of a common enclosure) with one or more of the speaker 48, control board 50, and microphone 52. Additionally, the active noise-canceling device 30 may include a plurality of microphones 52 to detect and convey noise from a plurality of locations within the intake vent 4. The active noise-canceling device 30 may thus be positioned to efficiently deliver noise-canceling sound to the right location with the right signal from the plurality of microphones 52. The system 10 as a whole, therefore, is quieter without solely relying on large passive noise attenuation such as foam or baffles. In some embodiments, a plurality of active noise-canceling devices 30 may share one or more microphones 52. The control boards 50 of each active noise-canceling devices 30 may use the shared one or more microphones 52 to detect and convey noise and deliver noise-canceling sound based on the noise from the shared one or more microphones 52.

In some embodiments, the system 10 may include one or more slave noise-canceling devices that include a housing 32 and one or more speakers 48, such that the one or more slave noise-canceling devices produce the noise-canceling sound delivered by the control boards 50. Similarly, in some embodiments, a plurality of active noise-canceling devices 30 may share one or more control boards 50 that may receive the noise detected and conveyed by one or more microphones 52. In some embodiments, one or more microphones 52, control boards 50, and/or speaker 48 of a plurality of active noise-canceling devices 30 may be connected by a communication network (e.g., wirelessly).

In some embodiments, the system 10 may include one or more passive noise attenuation devices that include a housing and noise attenuation media. For example, the noise attenuation media may include any type of soundproofing material, such as acoustic foam, acoustic fiber, sound barrier material, sound insulation, sound-deafening material, sound-dampening material, sound blanket, perforated panel, fiber panel, or any combination thereof. The noise attenuation media may reflect, absorb, and/or diffuse an incoming noise signal. In some embodiments, the one or more passive noise attenuation devices may be integrated with the active noise-canceling devices 30 and/or the one or more slave noise-canceling devices of the system 10, such that the one or more passive noise attenuation devices, the active noise-canceling devices 30 and/or the one or more slave noise-canceling devices are configured to minimize the incoming noise signals. That is, the one or more passive noise attenuation devices may be integrated with the active noise-canceling devices 30 and/or the one or more slave noise-canceling devices may each be tuned to the specific of location of where the device is located. In particular, the location of where the device is located may include materials and configurations that improve performance of noise control/cancellation/attenuation in that particular area. The particular signatures of the sound exiting the section may depend on a number of location-specific characteristics including the geometry of the ducts 29, the location of the device, physical properties of the gases passing through the location, among other things. These location-specific characteristics may be collected into a transfer function, which may be hard-wired into one or more active noise-canceling devices 30. Additionally, each device may be positioned in order to minimize the incoming noise signal.

Figure 3:
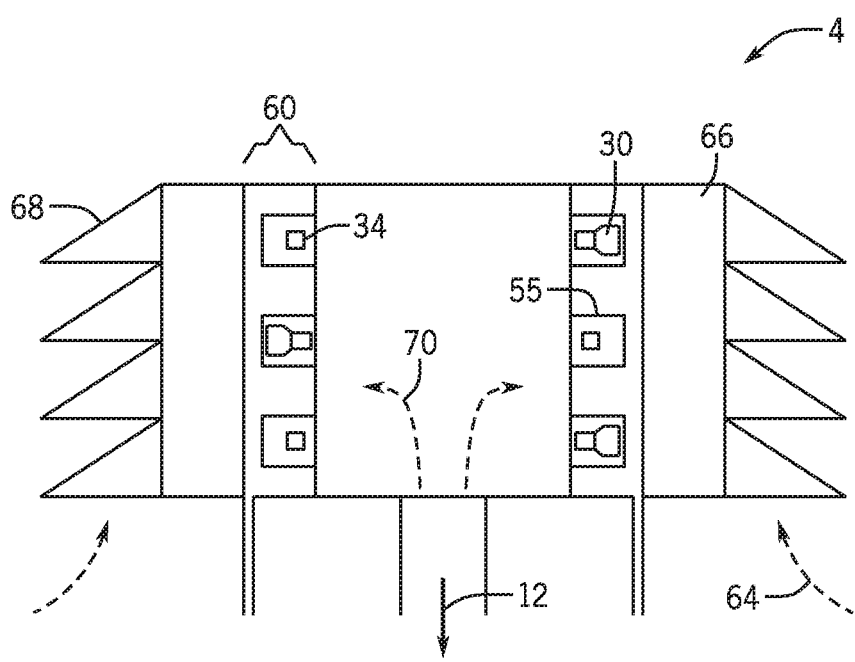
FIG. 3 is a cross-sectional view of an intake vent of a gas turbine engine system employing active noise-canceling devices, in accordance with an embodiment of the present disclosure.

FIG. 3 is a perspective view of an intake vent 4 of a gas turbine engine system 10, in accordance with an embodiment of the present disclosure. The intake vent 4 includes a filter house 60, that may contain one or more flow path holes 55. Air filters 34 (e.g. filter media, filter cartridge, filter canister, or any type of air filter device) may be inserted in the flow path holes 55. The air filter 34 may be made of a fibrous material designed to remove particulates from the air 64 entering the intake vent, such that the air may be used by the gas turbine engine 12. The intake vent 4 may include a pre-filter room 66, such as a louver room, that is adjacent to the filter house 60. The intake vent 4 also includes one or more filter hoods or weather hoods 68, that are configured to protect the air filter 34 from weather damage. Multiple weather hoods 68 may be configured in multiple rows. The weather hood 68 may be oriented downward to reduce far field noise impact and increase weather protection. As illustrated in FIG. 3, one or more active noise-canceling devices 30 may be connected to one or more air filters 34 of the filter house 60 via the fastener 36.

The active noise-canceling devices 30 may be oriented such that noise 70 generated by the noise source (e.g., the gas turbine engine 12) reaches the microphone 52 of the active noise-canceling device 30 before the speaker 48. As such, the noise propagates from the gas turbine engine 12 from within the intake vent 4 to the microphone 52 and then to the speaker 48 of each of the active noise-canceling devices 30. The speaker 48 of the active noise-canceling device 30 produces sound to control or reduce the noise detected by the microphone 52 based on the transfer function stored on the control board 50.

Figure 4:
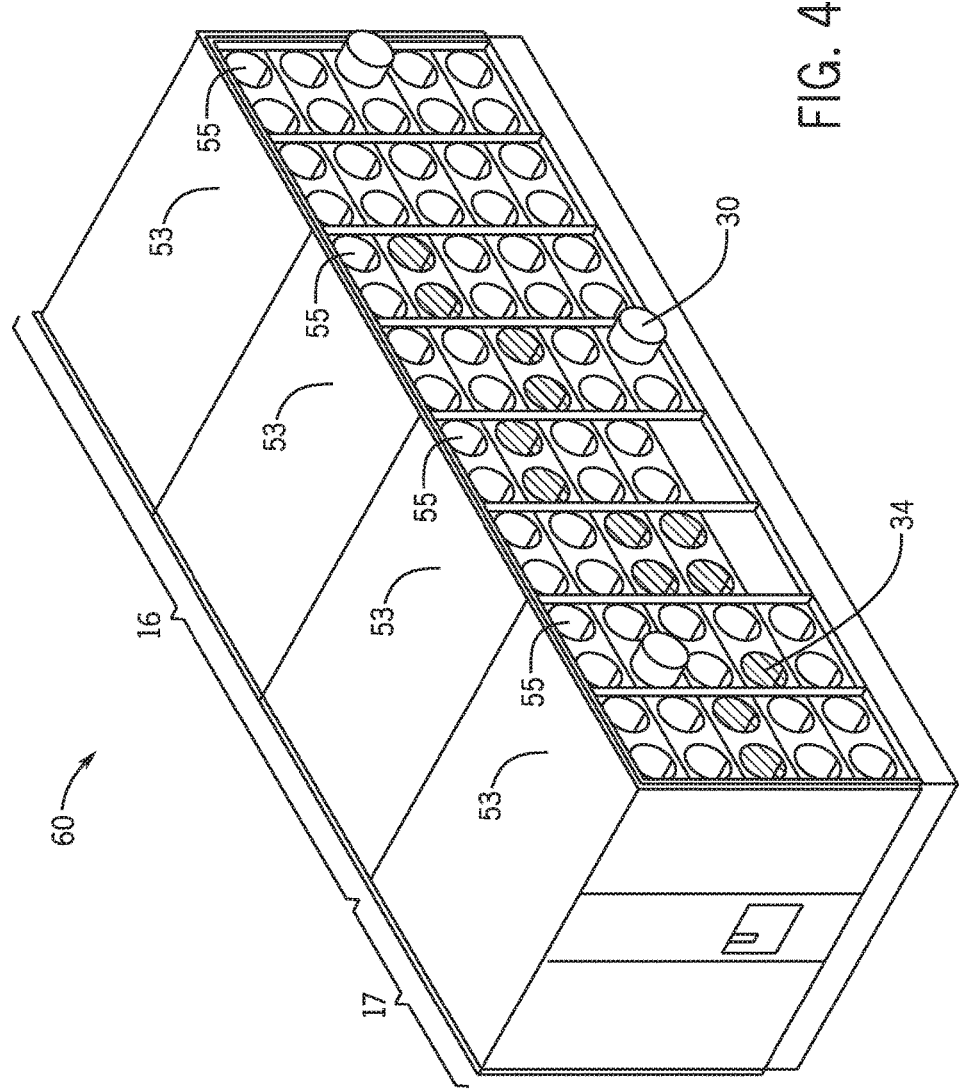
FIG. 4 is a perspective view of a filter house of an intake vent employing active noise-canceling devices, in accordance with an embodiment of the present disclosure.

FIG. 4 is a perspective view of the filter house 60 of the intake vent 4 employing the active noise-canceling devices 30, in accordance with an embodiment of the present disclosure. As illustrated, the filter house 60 may include four compartments 53 (a large section for combustion, consisting of 3 compartments in this embodiment, and a small section with 1 compartment for ventilation) having a number of flow path holes 55. Each flow path holes 55 may include an air filter 34. One or more of the active noise-canceling devices 30 may be mounted to one or more of the flow path holes 55 via the fastener 36 of the active noise-canceling device 30. The mounted active noise-canceling device 30 may also be connected to an air filter 34 inserted in the flow path hole 55. In some embodiments, the active noise-canceling device 30 and the air filter 34 may sit flush with the flow path hole 55. In some embodiments, as illustrated, a portion of the active noise-canceling device 30 may protrude or extend from the flow path hole 55, while the air filter 34 connected to the active noise-canceling device 30 is inside the flow path hole 55. Each flow path hole 55 may also represent a passage for air/gases which includes one of the active noise-canceling devices 30 positioned adjacently to the passage, as described below. In either case, the noise propagates from the noise source from within the filter house 60 to the microphone 52 and then to the speaker 48 of each of the active noise-canceling devices 30. The speaker 48 of the active noise-canceling device 30 produces sound to control or reduce the noise detected by the microphone 52 based on the transfer function stored on the control board 50.

The size and number of compartments 53 and flow path holes 55 within the compartment 53 may be adjusted to improve sound control and reduction. In the illustrated embodiment, each compartment includes about 20 intake flow path holes 55 through which the air is filtered and/or delivered to the interior sections of the enclosure 2. The combustion intake section 16 and the ventilation intake section 17 may be similar in size, that is, each includes equal number of compartments 53. In other embodiments, the combustion intake section 16 may be larger or smaller than the ventilation intake section 17. For example, the combustion intake section 16 may include three of the four compartments 53 of the intake vent 4, or one of the four compartments 53 of the intake vent 4.

Figure 5:
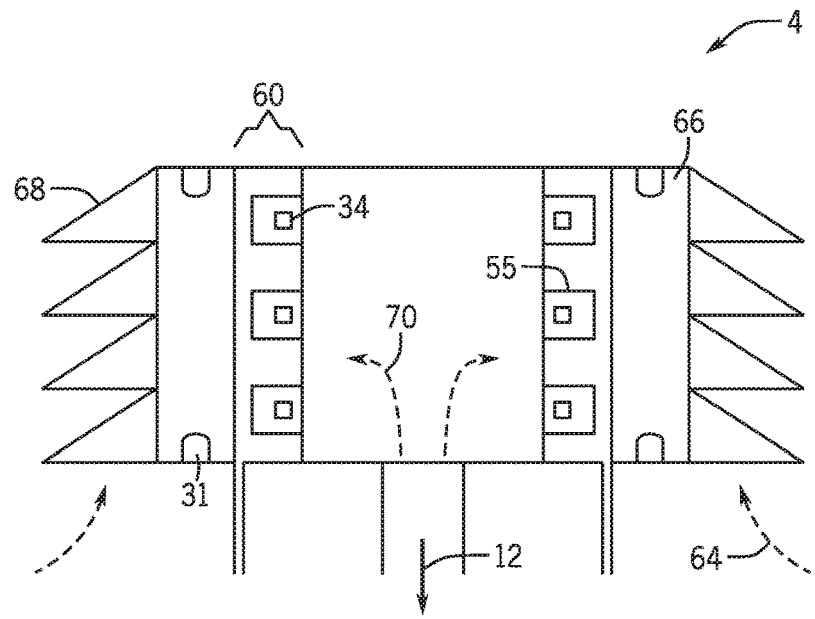
FIG. 5 is a cross-sectional view of an intake vent of a gas turbine engine system employing active noise-canceling devices, in accordance with an embodiment of the present disclosure.
Figure 6:
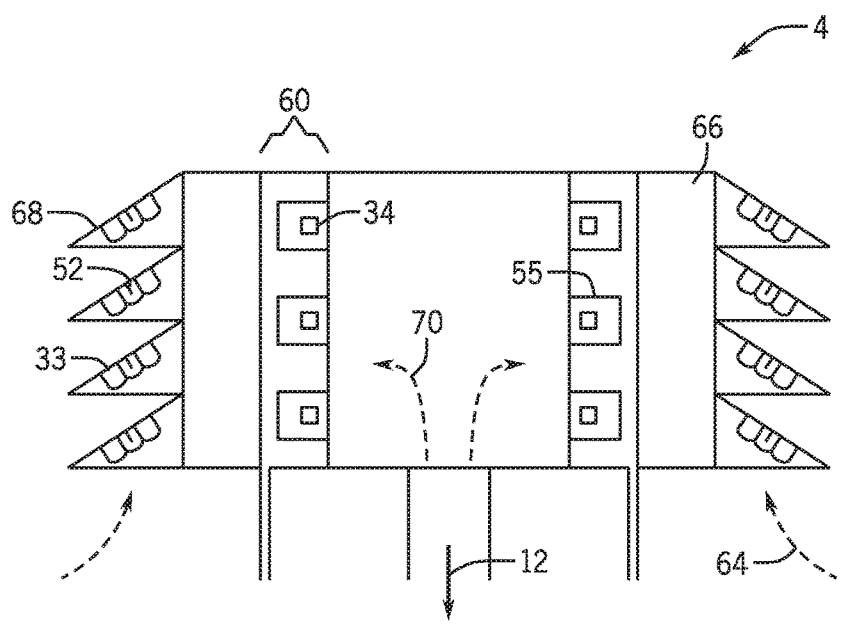
FIG. 6 is a cross-sectional view of an intake vent of a gas turbine engine system employing active noise-canceling devices, in accordance with an embodiment of the present disclosure.

In some embodiments, the active noise-canceling devices 30 may be additionally or alternatively used in portions of the intake vent 4 other than the filter house 60. As illustrated in FIG. 5, a perspective view of an embodiment of the intake vent 4 of the gas turbine engine system 10, one or more pre-filter active noise-canceling devices 31 may be installed in the pre-filter room 66. As illustrated in FIG. 6, a perspective view of an embodiment of the intake vent 4 of the gas turbine engine system 10, one or more hood active noise-canceling devices 33 may be installed in the weather hoods 68. For example, each weather hood may include a row of hood active noise-canceling devices 33 that share one microphone 52. The control boards 50 or a shared control board 50 of the one or more pre-filter active noise-canceling devices 31 or the row of hood active noise-canceling devices 33 may use the shared microphone 52 to detect and convey noise and deliver noise-canceling sound from the speaker 48 of each pre-filter active noise-canceling device 31 or hood active noise-canceling device 33. In some embodiments, one or more microphones 52 of the pre-filter active noise-canceling devices 31 or the hood active noise-canceling devices 33 may be positioned a greater distance from the speakers 48 of the active noise-canceling devices 31, 33 (e.g., at the filter house 60) than if the pre-filter active noise-canceling devices 31 or the hood active noise-canceling devices 33 were mounted within the duct 29 of the intake vent 4. The greater distance results in more delay time between detecting the noise by the one or more microphones 52 to generating the noise-canceling sound, which may result in more accurate measurements and better performance.

The location-specific constraints of the flow path into which the active noise-canceling device 30 is placed determine a shape and/or location of the air filter 34 and the housing 32. The air filter 34 and/or the housing 32 may, as shown in FIG. 2, have a cylindrical shape. Additionally and/or alternatively, each air filter 34 and the housing 32 may be made into other shapes (e.g., rectangular, flat, square, triangular, hexagonal, or others) to enable the active noise-canceling device 30 to fit a specific location within the system 10, or provide optimum flow conditions. That is, the shape of the housing 32 may be shaped to influence the air/gases to flow with minimum acoustic turbulence. The location of the active noise-canceling device 30 may be influenced by the available space within the system 10. That is, the active noise-canceling device 30 may be constrained to areas where other components of the system 10 are absent, and the shape of that space may determine the shape that the housing 32 and the air filter 34 should be. Additionally, an amount of noise control produced by the active noise-canceling device 30 may vary from one position to another and the location of the active noise-canceling device 30 may be influenced on this potential for noise control.

The location-specific characteristics associated with each position of active noise-canceling devices 30 within the intake vent 4 (i.e., the filter house 60, the pre-filter room 66, and the weather hoods 68) contribute to the transfer function stored within the control board 50 of each of the active noise-canceling devices 30. For example, the active noise-canceling device 30 in one position (e.g., the filter house 60) may respond to control noise in one frequency range (e.g., 100 Hz-1500 Hz or 100 Hz-2000 Hz) while the active noise-canceling device 30 in a different position (e.g., the weather hood 68) may respond to control noise of a different frequency range (e.g., 1500 Hz-3000 Hz or 1000 Hz-3000 Hz). In some embodiments, the design of the duct where the active noise-canceling device 30 is located may increase the effective frequency of the active noise-canceling device 30 to a higher range (e.g., from a conventional frequency of approximately 800 Hz to an effective frequency of approximately 1500 Hz). Additional active noise-canceling devices 30 may be combined to further narrow the frequency range of each individual active noise-canceling device 30. In some embodiments, using passive noise attenuation may achieve even higher effective frequency ranges (e.g., from the effective frequency of approximately 1500 Hz to an even higher effective frequency of approximately 3000 Hz). For example, frequency ranges may include approximately 100 Hz-1066 Hz, approximately 1066 Hz-2033 Hz, and approximately 2033 Hz-3000 Hz for three different active noise-canceling devices 30. It may be appreciated that other division of frequency ranges are also contemplated. Furthermore, active noise-canceling devices 30 may overlap the frequencies that are controlled or reduced. Thus, for a particular set of location-specific characteristics the intake vent 4 as a whole, may efficiently control or reduce the noise emanating from within the enclosure 2 of the system 10. The size and number of the flow path holes 55 of the filter house 60, the size and configuration of the pre-filter room 66, and/or the size and number of the weather hoods 68, may be adjusted to improve sound control and reduction.

Technical effects of the invention include a system 10 that includes an active noise-canceling device 30 within the system 10 that contains a transfer function that has been adjusted to respond to location-specific characteristics of the system 10 and the active noise-canceling device 30. The transfer function enables cancellation of sound produced by a noise source (e.g., gas turbine engine 12) before the sound exits the system 10. The active noise-canceling device 30 may thus be installed within systems that have space and/or size restrictions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A device comprising:
   a housing;
   a core configured to be secured within the housing, comprising:
      a microphone configured to detect a sound signal;
      a control board configured to generate a noise-canceling sound signal based on the sound signal and a set of transfer functions; and
      a speaker configured to deliver the noise-canceling sound signal; and
   a fastener configured to connect the housing to an air filter, wherein the air filter is configured to insert into a filter housing of a power generation unit and remove particulates from air entering the power generation unit.

2. The device of claim 1, wherein the fastener is configured to mount the housing within a duct of an intake vent of the power generation unit.

3. The device of claim 1, wherein the fastener is configured to mount the housing within a pre-filter room of the power generation unit.

4. The device of claim 1, wherein the power generation unit comprises a steam turbine unit, a combustion power generation unit, an industrial process unit, a compressor, a power drive unit, a gas turbine engine, or a combination thereof.

5. The device of claim 1, wherein a second fastener is configured to connect the air filter to a predetermined portion of the power generation unit.

6. The device of claim 1, wherein the fastener is configured to generate an integrated component comprising the housing and the air filter.

7. The device of claim 1, wherein the control board is configured to generate the noise-canceling sound signal based on location-specific characteristics programmed into the set of transfer function for a location of the device.

8. A system, comprising:
an air intake for use within a power generation unit, comprising:
an air filter housing;
a plurality of air filters disposed in the air filter housing;
a plurality of modular active noise-canceling devices, wherein each modular active noise-canceling device of the plurality of modular active noise-canceling devices is configured to couple to a respective air filter of the plurality of air filters, and wherein each modular active noise-canceling device of the plurality of modular active noise-canceling devices comprises:
a housing;
a core configured to be secured within the housing, comprising a microphone configured to detect a sound signal;
a fastener configured to connect the housing to the respective air filter of the plurality of air filters; and
a speaker configured to deliver a noise-canceling sound signal; and
a control board configured to generate noise-canceling sound signals based on the sound signals detected by the microphones of the plurality of modular active noise-canceling devices and a set of transfer functions.

9. The system of claim 8, wherein the air intake comprises one or more slave noise-canceling devices comprising a housing and a speaker configured to deliver a noise-canceling sound signal.

10. The system of claim 9, wherein the control board is configured to control the one or more slave noise-canceling devices based at least on the sounds signals detected by the microphones of the plurality of modular active noise-canceling devices and a set of transfer functions.

11. The system of claim 8, wherein the air intake comprises one or more noise attenuation devices comprising a housing and noise attenuation media.

12. The system of claim 11, wherein the control board is configured to generate the noise-canceling sound signal based on location-specific characteristics programmed into the set of transfer function for a location of each modular active noise-canceling device of the plurality of modular active noise-canceling devices, and the one or more noise attenuation devices are positioned based on location-specific characteristics in order to attenuate the sound signals detected by the microphones of the plurality of modular active noise-canceling devices.

13. The system of claim 8, wherein the control board is configured to generate the noise-canceling sound signal based on location-specific characteristics programmed into the set of transfer function for a location of each modular active noise-canceling device of the plurality of modular active noise-canceling devices.

14. The system of claim 8, wherein the air intake comprises a plurality of flow path holes, where one of the flow path holes of the plurality of flow path holes only comprises the air filter.

15. The system of claim 8, wherein the air intake comprises a pre-filter room, wherein the pre-filter room comprises a pre-filter modular active noise-canceling device, wherein the housing of the pre-filter modular active noise-canceling device is configured to connect to the pre-filter room.

16. The system of claim 8, wherein the air intake comprises a weather hood, wherein the weather hood comprises a hood modular active noise-canceling device, wherein the housing of the hood modular active noise-canceling device is configured to connect to the weather hood.

17. A device comprising:
a housing configured to connect to a weather hood of an intake vent of an enclosure of a power generation unit;
a core configured to be secured within the housing, comprising a control board configured to generate a noise-canceling sound signal based on a sound signal generated by the power generation unit and a set of transfer functions;
a speaker configured to deliver the noise-canceling sound signal; and
a fastener configured to connect the housing to an air filter, wherein the air filter is configured to insert into a filter housing of the power generation unit and remove particulates from air entering the power generation unit.

18. The device of claim 17, wherein the control board is configured to generate the noise-canceling sound signal based on location-specific characteristics programmed into the set of transfer function for a location of the device.

19. The device of claim 17, comprising one or more microphones configured to detect the sound signal.

20. The device of claim 19, wherein the control board is configured to communicate with one or more microphones via a communication network.

21. The device of claim 1, wherein the device is configured to provide enhanced flow conditions relative to a passive noise abatement system to generate increased performance of the power generation unit.

* * * * *